Dec. 3, 1935.  H. SLAVIN  2,022,745
TRAFFIC SAFETY DEVICE
Filed March 5, 1934
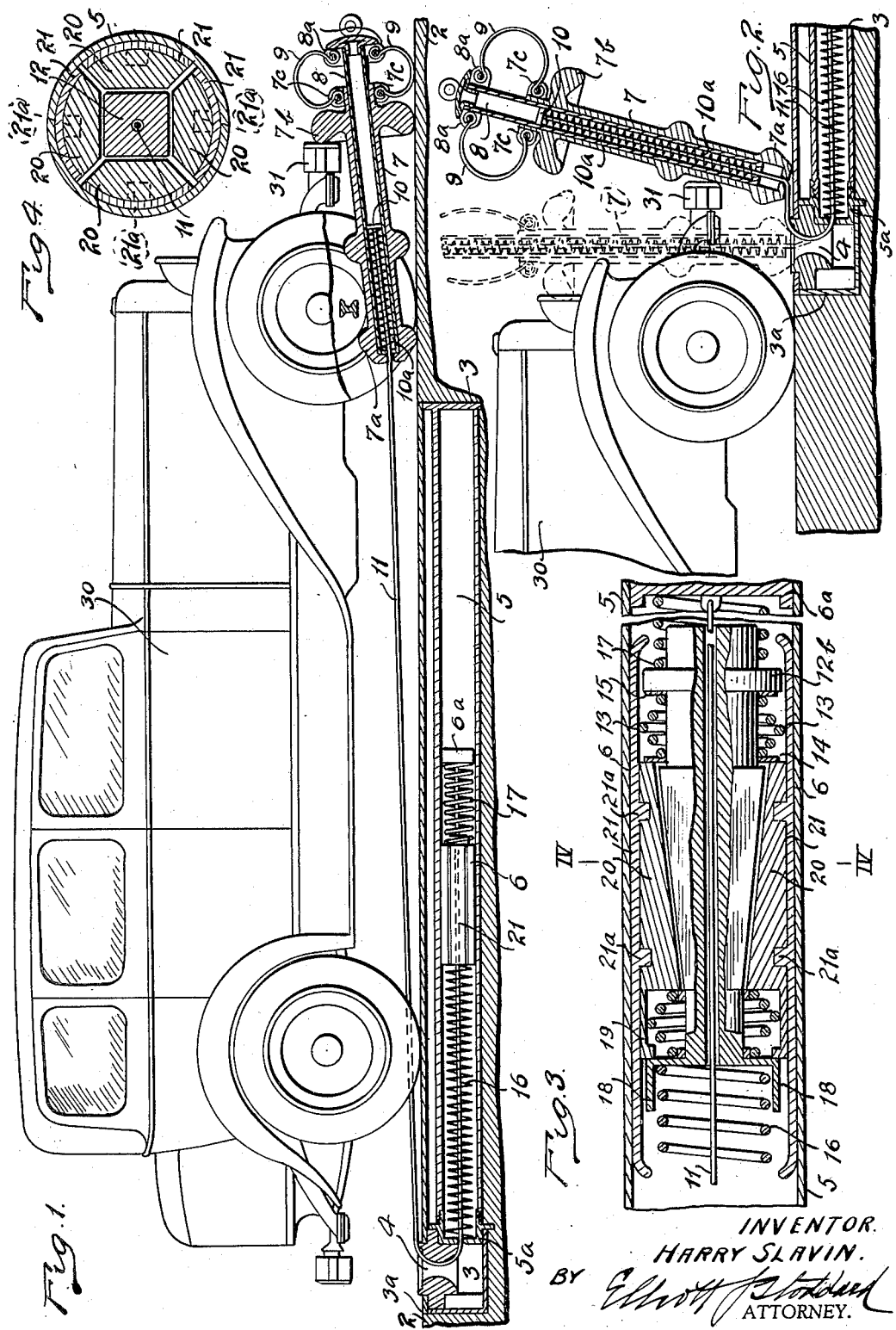
INVENTOR.
HARRY SLAVIN.
BY
ATTORNEY.

Patented Dec. 3, 1935

2,022,745

UNITED STATES PATENT OFFICE 2,022,745

TRAFFIC SAFETY DEVICE

Harry Slavin, Detroit, Mich.

Application March 5, 1934, Serial No. 714,123

13 Claims. (Cl. 188—32)

My invention relates to traffic safety devices and an object of my improvements is to automatically arrest the motion of an automobile in a dangerous path.

I secure this object by means of the apparatus illustrated in the accompanying drawing, in which:—

Figure 1 is a detail sectional view of an apparatus embodying my invention showing an automobile in elevation, a wheel being partly broken away, the parts being in the position in which they have arrested the motion of the vehicle.

Figure 2 is a partial view similar to Figure 1, the parts being shown in the position taken when the automobile has just engaged the same.

Figure 3 is a detail sectional view showing the brake cross-head and a part of the containing tube.

Figure 4 is a sectional view taken on line IV—IV of Figure 3.

30 indicates the automobile as a whole.

2, 2 is the road bed and 3, 3 is a cavity in the road bed parallel and below the surface of the road bed. There is a vertical passage 3a at the left hand end of the passage 3, which forms an opening of the passage 3 to the surface of the road bed. At the upper end of the passage 3a is placed a block 4 having a central aperture therethrough, which has its edge, or wall, rounded in cross section, as shown in Figures 1 and 2, for the purpose hereinafter described.

5 is a metal tube placed in the cavity 3 below and parallel to the surface of the road bed. The left hand end of the tube 5 is closed by a head 5a, except for a central aperture therethrough. 6 is a composite cross-head adapted to reciprocate in the tube 5. 6a is a piston adapted to slide in the tube 5. 17 is a compression spring between the cross-head 6 and the piston 6a. 16 is a compression spring between the head 5a of the tube 5 and the cross-head 6. 11 is a cable one end of which is secured to the piston 6a. The cable 11 passes from the piston 6a through a coaxial aperture in the cross-head 6 thence through the opening at the center of the head 5a, then passes through the opening in the block 4, engaging around its curved wall and passes to the hollow post 7.

The post 7 is preferably cylindrical in cross section and has a coaxial bore closed at its lower end except for a central aperture through which the cable 11 passes. 8 is a tube adapted to reciprocate and fit in the bore of the post 7. 7c, 7c are lugs extending laterally from the post 7, at its upper end. 8a, 8a are similar lugs upon the protruding upper end of the tube 8. 9, 9 are springs, the ends of which are pivoted to the lugs 8a and 7c and act to hold the tube 8 with its end extending from the post 7, a definite distance.

There is a piston 10 adapted to reciprocate in the tube 8. There is a compression spring 10a between the piston 10 and the lower end of the tube 8. 7b, 7b are engaging lugs upon the upper end of the post 7.

The bowed springs 9 cushion the contact of the post with the road bed when it is knocked over by an automobile. The spring 16 acts to force the cross-head 6 toward the right hand end of the tube 5 and in this position it draws upon the cable 11 to bring the post 7 to the position shown in broken lines in Figure 2 and hold it upright in this position.

Referring more particularly to Figures 3 and 4, the cross-head 6 has a central solid core 12, having an extension 12a. This is rectangular in cross section, as shown in Figure 4 and has sloping sides thus constituting a pyramidal shape. There are four brake blocks 20 having inner surfaces shaped and fitting to the outer surfaces of the core 12. Each of the brake blocks 20 has a brake shoe 21 interposed between its outer surface and the inner surface of the tube 5. The shoes 21 are held in position by dowels 21a.

18 is a circular flanged plate engaging against the outer ends of projections from the outer edges of the brake shoes 21 rigidly attached to the core 12. 19 is a compression spring between the plate 18 and the brake shoes 21 and bearing against the inner surfaces of the said projections from the shoes 21. The spring 17 engages against the plate 18, as distinctly shown in Figure 3.

12b is an annular projection extending around the extension 12a from the core 12, of the cross-head 6. 13 is a compression spring bearing at one end against a washer 14 that engages the ends of the brake blocks 20 and at the other end acting against a washer 15 which engages against the flange 12b. The shape of the spring 13 is such that it engages the inner surfaces of the brake shoes 21.

The operation of the above described device is as follows:—

The bumper 31 of the automobile engages against the post 7 and forces it out of its position bending it over and moving it along the surface of the road. The cable 11 drawing on the piston 6a compresses the spring 17 against the flange 12b and forces the cross-head toward the left, the motion of which is resisted by the spring 16 engaging against the plate 18. The pressure of the spring 17 acts against the brake blocks 20 forcing them along the inclined surfaces of the core 12 and pressing them outward, thus engaging the brake shoes 21 against the inner surface of the tube 5 and forming a frictional resistance to the motion of the cross-head 6. The cable 11 will also have its motion resisted by its friction against the curved wall of the aperture through the block 4.

The tension upon the cable 11 draws the piston 10 downward which acts through the spring 10a against the lower end of the tube 8 and forces said tube inward in the post 7, against the action of the springs 9. When the tube 8 has reached the bottom of the bore of the post 7 its motion is arrested and the further motion of the piston 10 acts to compress the spring 10a only.

Thus it will be seen that the first action of the impact of the automobile is resisted by the light springs 9 in the outer end of the cable and by the comparatively light spring 17 at its inner end. That the further action upon the post 7 is taken at the outer end by the spring 10a and at the inner end, principally, by the spring 16, and that the resistance of the springs are supplemented by a frictional resistance of the cross-head 6 and the cable on the wall of the block 4.

The impact of the automobile is taken by the light springs 9 and 17 before any part that has a substantial amount of inertia is moved.

The post 7 thus forms an obstruction member that brings the automobile gradually to rest in its line of motion whatever that may be.

When the post 7 is returned by the springs to its normal position as shown in broken lines in Figure 2, it closes the aperture through the block 4, so that no foreign matter can fall therethrough and interfere with the action of the apparatus below the road bed.

What I claim is:

1. In an apparatus of the kind described, the combination of a post adapted to automatically engage with an automobile, and a yielding and retracting means connected to said post and to the road-bed and maintaining a tension upon said post, the parts being so connected and constructed that said tension shall normally hold said post in a vertical position, said post being adapted to move along the road-bed.

2. In an apparatus of the kind described, the combination with a movable obstruction member adapted to be automatically engaged by a moving automobile, a passage in the road-bed, a cross-head adapted to reciprocate in said passage, a spring adapted to actuate said cross-head, and a flexible connection between said cross-head and said member, a guide surface, said connection passing over and frictionally engaging said guide surface, as and for the purpose described.

3. In an apparatus of the kind described, the combination with a movable obstruction member adapted to be automatically engaged by a moving automobile, a stationary guide, a cross-head movable on said guide, said cross-head being connected to said member and a brake on said cross-head adapted to engage said guide and adapted to bring said automobile gradually to rest.

4. In an apparatus of the kind described, the combination with a movable obstruction member adapted to be automatically engaged by a moving automobile, a guide, a cross-head movable on said guide, a connection between said cross-head and said member passing movably through said cross-head and engaging a second member, and a spring between said cross-head and said second member.

5. In an apparatus of the kind described, the combination with a movable obstruction member adapted to be automatically engaged by a moving automobile, a stationary guide, a cross-head movable on said guide, said cross-head being connected to said member and a brake on said cross-head adapted to engage said guide, and to be actuated through the connection between said cross-head and said member adapted to bring said automobile gradually to rest.

6. In an apparatus of the kind described, a movable member adapted to be engaged by a moving automobile, a spring upon said member, means connecting said member to the road-bed through said spring, and a second spring functionally between the first named spring and said member.

7. In an apparatus of the kind described, a movable structure adapted to be engaged by a moving automobile, said structure including a post having a longitudinal bore, a part adapted to slide in said bore, said part being secured by a connection to the road-bed, a spring functionally interposed between said connection and said part, and a second spring interposed between said post and said part.

8. In an apparatus of the kind described, a movable structure adapted to be engaged by a moving automobile, said structure including a post having a longitudinal bore, a part adapted to slide in said bore, said part being secured by a connection to the road-bed, a spring functionally interposed between said connection and said part, and a second spring interposed between said post and said part, said second spring being bowed and having its ends connected to said post and part respectively.

9. The combination with a road-bed adapted to automobile traffic of an obstruction member adapted to be automatically engaged by a moving automobile, said member being movable in the various horizontal directions that the automobile may be moving, and a yielding connection between said member and said road-bed adapted to bring said automobile gradually to rest.

10. The combination with a road-bed adapted to automobile traffic of an obstruction member adapted to be automatically engaged by a moving automobile, said member being movable in the various horizontal directions that the automobile may be moving, and a yielding and retracting connection between said member and said road-bed adapted to bring said automobile gradually to rest.

11. The combination with a road-bed adapted to automobile traffic of an obstruction member adapted to be automatically engaged by a moving automobile, said member being movable as a whole in the various horizontal directions of motion of the automobile, and a yielding member connected to said road-bed and to said obstruction member adapted to bring said automobile gradually to rest.

12. The combination with a road-bed adapted to automobile traffic, of an obstruction member adapted to be automatically engaged by a moving automobile, a resisting and retracting apparatus below the surface of said road-bed, a connection between said member and said apparatus, said member being adapted to close the passage leading to the enclosure of said apparatus when in its normal retracted position.

13. The combination with a road-bed adapted to automobile traffic of an obstruction member adapted to be automatically engaged by a moving automobile, said member being movable as a whole in the various horizontal directions of motion of the automobile, and a yielding member directly connected to said road-bed and to said obstruction member adapted to bring said automobile gradually to rest.

HARRY SLAVIN.